(No Model.)

W. H. PERKINS.
PUMP NIPPLE.

No. 596,787.   Patented Jan. 4, 1898.

Witnesses.

Walter H. Perkins,
Inventor.

United States Patent Office.

WALTER H. PERKINS, OF WATERBURY, CONNECTICUT, ASSIGNOR TO THE WATERBURY MANUFACTURING COMPANY, OF SAME PLACE.

PUMP-NIPPLE.

SPECIFICATION forming part of Letters Patent No. 596,787, dated January 4, 1898.

Application filed September 7, 1897. Serial No. 650,749. (No model.)

*To all whom it may concern:*

Be it known that I, WALTER H. PERKINS, of Waterbury, in the county of New Haven and State of Connecticut, have invented a new Improvement in Pump-Nipples; and I do hereby declare the following, when taken in connection with the accompanying drawings and the letters of reference marked thereon, to be a full, clear, and exact description of the same, and which said drawings constitute part of this specification, and represent, in—

Figure 1:
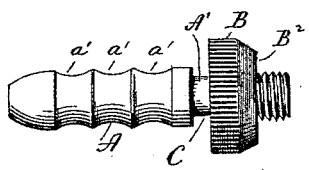
Figure 2:
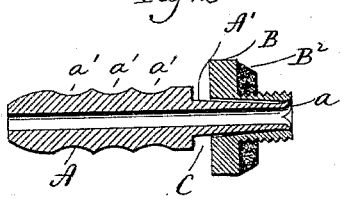
Figure 3:
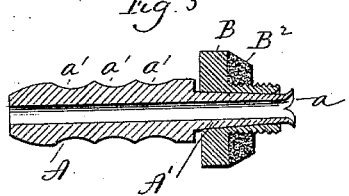
Figure 4:
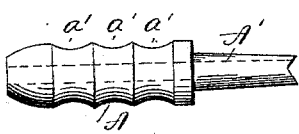
Figure 5:
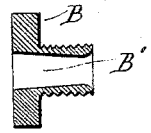

Figure 1, a view in side elevation of a pump-nipple constructed in accordance with my invention; Fig. 2, a sectional view thereof with its take-up space open; Fig. 3, a similar view showing the utilization of the take-up space in forming an air-tight joint between the shank of the nipple and the nut; Fig. 4, a detached view of the nipple; Fig. 5, a detached sectional view of the nut.

My invention relates to an improvement in pump-nipples, the object being to produce a simple, compact, and convenient article, constructed with particular reference to security against leakage at the time of use, and primarily designed to be used in conjunction with bicycle-pumps.

With these ends in view my invention consists in a nipple having certain details of construction and combinations of parts, as will be hereinafter described, and pointed out in the claim.

In carrying out my invention I provide the nipple A with a shank A', which is not only longer than the shanks of such nipples ordinarily are, but is made tapering from its base to its outer end. The nut B, which is applied to the said tapering shank so as to freely rotate thereupon, is formed with a tapering opening $B^2$, corresponding in taper to the tapering shank A' aforesaid. The said nut is furnished with a packing $B^3$ of any approved material and made enough shorter in length than the length of the shank to provide what I may call a "take-up" space C between the base of the shank and the nut when the same is moved outward to the limit of its outward movement on the shank. The nut and shank are coupled together by upsetting the extreme outer end of the shank, as at $a$ in Figs. 2 and 3.

The nipple A may be constructed in any approved manner for the application and retention of the tube of a pump. As herein shown, it is formed with three wide annular grooves $a'$ for that purpose.

In using my improved nipple in conjunction with a bicycle-pump the nut is applied to the tire-valve and screwed firmly thereto, so as to bring the packing $B^2$ into play for establishing an air-tight connection between the valve and the nut. The nipple is then thrust inward, so as to take up the whole or a part of the take-up space C, whereby the tapered walls of the shank are brought into such close contact with the walls of the tapered opening of the nut that an air-tight joint will be formed between the nut and shank capable of resisting any pressures which may be put upon it in the use of the nipple.

Having fully described my invention, what I claim as new, and desire to secure by Letters Patent, is—

A pump-nipple, having its shank tapered and its nut formed with an opening of corresponding taper, the nut being free to rotate upon the said shank which is longer than the nut so as to provide a "take-up" space, substantially as described.

In testimony whereof I have signed this specification in the presence of two subscribing witnesses.

WALTER H. PERKINS.

Witnesses:
 JOHN S. NEAGLE,
 ALBERT G. FINNEY.